US010035494B2

(12) United States Patent
Sute

(10) Patent No.: US 10,035,494 B2
(45) Date of Patent: Jul. 31, 2018

(54) VEHICLE PASSIVE ENTRY/PASSIVE START SYSTEM

(71) Applicants: DENSO International America, Inc., Southfield, MI (US); DENSO CORPORATION, Kariya-shi, Aichi-ken (JP)

(72) Inventor: Steven Sute, Dearborn, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/437,236

(22) Filed: Feb. 20, 2017

(65) Prior Publication Data

US 2018/0154866 A1 Jun. 7, 2018

Related U.S. Application Data

(60) Provisional application No. 62/430,532, filed on Dec. 6, 2016.

(51) Int. Cl.
*B60R 25/24* (2013.01)
*F02N 11/08* (2006.01)
(Continued)

(52) U.S. Cl.
CPC .......... *B60R 25/24* (2013.01); *F02N 11/0807* (2013.01); *H02J 7/025* (2013.01);
(Continued)

(58) Field of Classification Search
CPC .............. B60R 25/24; B60R 2325/205; B60R 2325/101; H02J 50/12; H02J 7/025;
(Continued)

(56) References Cited

U.S. PATENT DOCUMENTS 6,853,853 B1 * 2/2005 Van Wiemeersch .... B60R 25/04
340/5.2
8,660,549 B2 * 2/2014 Hrabak ................... H04W 4/20
455/419
(Continued)

FOREIGN PATENT DOCUMENTS

BE 1016521 A6 12/2006
CA 2103772 A1 2/1995
(Continued)

*Primary Examiner* — Tyler J Lee
(74) *Attorney, Agent, or Firm* — Harness, Dickey & Pierce, P.L.C.

(57) ABSTRACT

A combined vehicle passive entry/passive start (PEPS) and mobile electronic device wireless charging system. The system includes a vehicle transmitter configured to transmit a signal in accordance with a wireless charging protocol. The signal is transmitted through a first wireless communications channel for receipt by a mobile electronic device. A vehicle receiver is configured to receive response data from the mobile electronic device through a second wireless communications channel. The response data is generated by the mobile electronic device in response to receipt of the signal transmitted by the vehicle transmitter. A vehicle processor module is configured to at least one of unlock doors of the vehicle and start the vehicle in response to receipt of the response data by the vehicle receiver.

14 Claims, 3 Drawing Sheets

(51) Int. Cl.
- *H02J 7/02* (2016.01)
- *H02J 50/12* (2016.01)
- *H04W 4/08* (2009.01)
- *H04W 4/80* (2018.01)
- *H04W 4/00* (2018.01)
- *H02J 7/00* (2006.01)

(52) U.S. Cl.
CPC ......... *H02J 50/12* (2016.02); *B60R 2325/101* (2013.01); *B60R 2325/205* (2013.01); *F02N 2200/106* (2013.01); *H02J 2007/0096* (2013.01); *H04W 4/008* (2013.01); *H04W 4/80* (2018.02)

(58) Field of Classification Search
CPC . H02J 2007/0096; H04W 4/80; H04W 4/008; F02N 11/0807; F02N 2200/106
USPC ...................................................... 701/2, 36
See application file for complete search history.

(56) References Cited

U.S. PATENT DOCUMENTS

| | | | |
|---|---|---|---|
| 2001/0012775 A1 | 8/2001 | Modzelesky et al. | |
| 2001/0056544 A1 | 12/2001 | Walker | |
| 2004/0145491 A1 | 7/2004 | Nascimento | |
| 2004/0201277 A1 | 10/2004 | Hentsch et al. | |
| 2005/0285724 A1 | 12/2005 | Schmidt et al. | |
| 2006/0105795 A1 | 5/2006 | Cermak et al. | |
| 2007/0082706 A1 | 4/2007 | Campbell et al. | |
| 2008/0231417 A1 | 9/2008 | Kurpinski et al. | |
| 2010/0066492 A1 | 3/2010 | Tarmoom et al. | |
| 2010/0102924 A1 | 4/2010 | King et al. | |
| 2010/0198428 A1 | 8/2010 | Sultan et al. | |
| 2010/0241347 A1 | 9/2010 | King et al. | |
| 2010/0308986 A1 | 12/2010 | Dobryden et al. | |
| 2011/0001722 A1 | 1/2011 | Newman et al. | |
| 2011/0118934 A1 | 5/2011 | Lowrey et al. | |
| 2012/0041618 A1 | 2/2012 | Sun et al. | |
| 2012/0268242 A1 | 10/2012 | Tieman et al. | |
| 2012/0280805 A1 | 11/2012 | Magner et al. | |
| 2013/0130674 A1 | 5/2013 | De Wind et al. | |
| 2013/0288659 A1* | 10/2013 | Hrabak | H04W 4/20 455/419 |
| 2014/0097937 A1* | 4/2014 | Gercekci | G08C 17/02 340/5.61 |
| 2014/0121890 A1* | 5/2014 | Gercekci | G08C 17/02 701/33.2 |
| 2014/0129054 A1 | 5/2014 | Huntzicker et al. | |
| 2014/0188309 A1 | 7/2014 | Caratto et al. | |
| 2014/0188348 A1 | 7/2014 | Gautama et al. | |
| 2014/0218189 A1 | 8/2014 | Fleming et al. | |
| 2014/0240091 A1 | 8/2014 | Talty et al. | |
| 2014/0274013 A1 | 9/2014 | Santavicca | |
| 2014/0293753 A1 | 10/2014 | Pearson | |
| 2014/0330449 A1 | 11/2014 | Oman et al. | |
| 2015/0048927 A1 | 2/2015 | Simmons | |
| 2015/0161834 A1 | 6/2015 | Spahl et al. | |
| 2015/0170447 A1 | 6/2015 | Buzhardt | |
| 2015/0363988 A1 | 12/2015 | Van Wiemeersch et al. | |
| 2016/0049033 A1* | 2/2016 | Sigal | B60R 25/24 340/5.61 |
| 2016/0063227 A1 | 3/2016 | Kobres et al. | |
| 2016/0063786 A1 | 3/2016 | Lewis et al. | |
| 2016/0087485 A1* | 3/2016 | Maeda | H02J 7/025 455/573 |
| 2016/0111001 A1 | 4/2016 | Lin et al. | |
| 2016/0148453 A1 | 5/2016 | Chang et al. | |
| 2016/0203661 A1 | 7/2016 | Pudar et al. | |
| 2016/0249157 A1 | 8/2016 | Fine | |
| 2017/0236351 A1* | 8/2017 | Menard | G07C 9/00309 340/5.61 |
| 2017/0251092 A1* | 8/2017 | Elie | H04W 4/80 |
| 2017/0294062 A1* | 10/2017 | Van Wiemeersch | G07C 9/00111 |

FOREIGN PATENT DOCUMENTS

| | | |
|---|---|---|
| CN | 103332170 A | 10/2013 |
| CN | 104925021 A | 9/2015 |
| DE | 10301793 A1 | 8/2004 |
| DE | 102008052077 A1 | 4/2010 |
| FR | 2884787 A1 | 10/2006 |
| WO | WO-9922341 A1 | 5/1999 |
| WO | WO-0072251 A1 | 11/2000 |
| WO | WO-02091308 A1 | 11/2002 |
| WO | WO-06027155 A1 | 3/2006 |
| WO | WO-10070398 A1 | 6/2010 |
| WO | WO-11147865 A1 | 12/2011 |
| WO | WO-13103316 A1 | 7/2013 |
| WO | WO-16080930 A1 | 5/2016 |

* cited by examiner

VEHICLE PASSIVE ENTRY/PASSIVE START SYSTEM

CROSS-REFERENCE TO RELATED APPLICATIONS

This application claims the benefit of U.S. Provisional Application No. 62/430,532, filed on Dec. 6, 2016. The entire disclosure of the above application is incorporated herein by reference.

FIELD

The present disclosure relates to a passive entry/passive start system for vehicle, such as a combined passive entry/passive start and wireless charging system for a vehicle and mobile device.

BACKGROUND

This section provides background information related to the present disclosure, which is not necessarily prior art.

Conventional passive entry/passive start (PEPS) systems for motor vehicles transmit a low frequency (LF) radio signal to a key fob, which responds by way of an ultra-high frequency signal to the vehicle to authenticate passive entry or starting. Use of LF signals allows for accurate and predictable location of the key fob relative to the vehicle, which is necessary to ensure only authorized access to the vehicle. PEPS LF communication protocols are not adaptable to commercial mobile devices, such as smartphones. Other PEPS systems use Bluetooth signals to locate and communicate with smartphones. However, the Bluetooth communication frequency band is highly susceptible to reflection and distortion, and is not suitable for accurately determining the location of the smartphone.

While current PEPS systems and wireless charging systems are suitable for their intended use, they are subject to improvement. The present teachings provide for a combined PEPS and wireless charging system that improves upon current systems, and provides numerous advantages as described herein and as one skilled in the art will appreciate.

SUMMARY

This section provides a general summary of the disclosure, and is not a comprehensive disclosure of its full scope or all of its features.

The present teachings include a combined vehicle passive entry/passive start (PEPS) and mobile electronic device wireless charging system. The system includes a vehicle transmitter configured to transmit a signal in accordance with a wireless charging protocol. The signal is transmitted through a first wireless communications channel for receipt by a mobile electronic device. A vehicle receiver is configured to receive response data from the mobile electronic device through a second wireless communications channel. The response data is generated by the mobile electronic device in response to receipt of the signal transmitted by the vehicle transmitter. A vehicle processor module is configured to at least one of unlock doors of the vehicle and start the vehicle in response to receipt of the response data by the vehicle receiver.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 4:
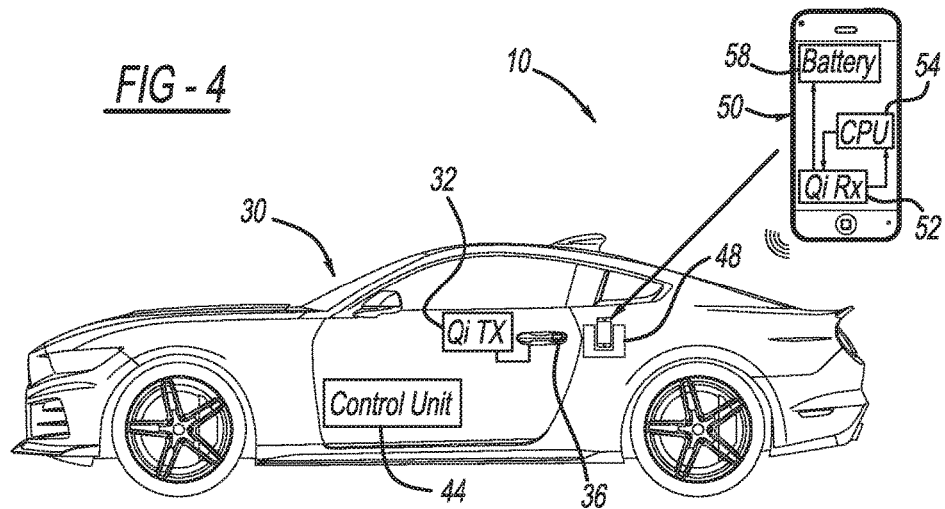
Figure 5:
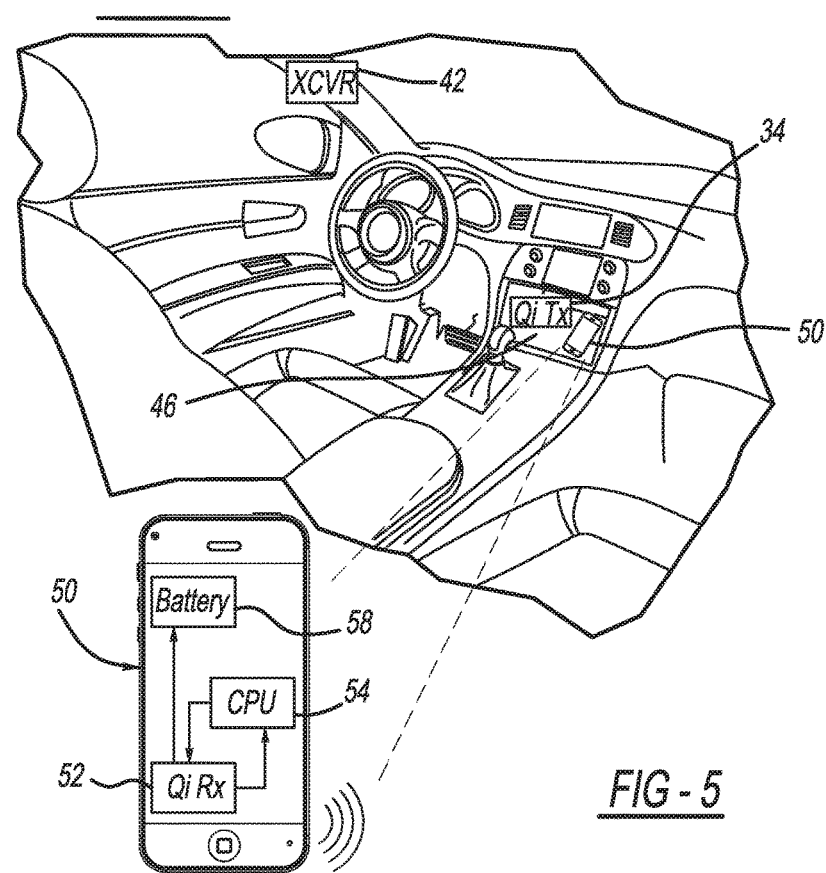

FIG. 4 illustrates the combined passive entry/passive start (PEPS) and wireless charging system for a mobile electronic device in accordance with the present teachings, the system being used for charging the mobile device outside of the vehicle; and FIG. 5 illustrates the combined passive entry/passive start (PEPS) and wireless charging system for a mobile electronic device in accordance with the present teachings, the system being used for charging the mobile device inside the vehicle.

Corresponding reference numerals indicate corresponding parts throughout the several views of the drawings.

DETAILED DESCRIPTION

Example embodiments will now be described more fully with reference to the accompanying drawings.

Figures 1, 2:
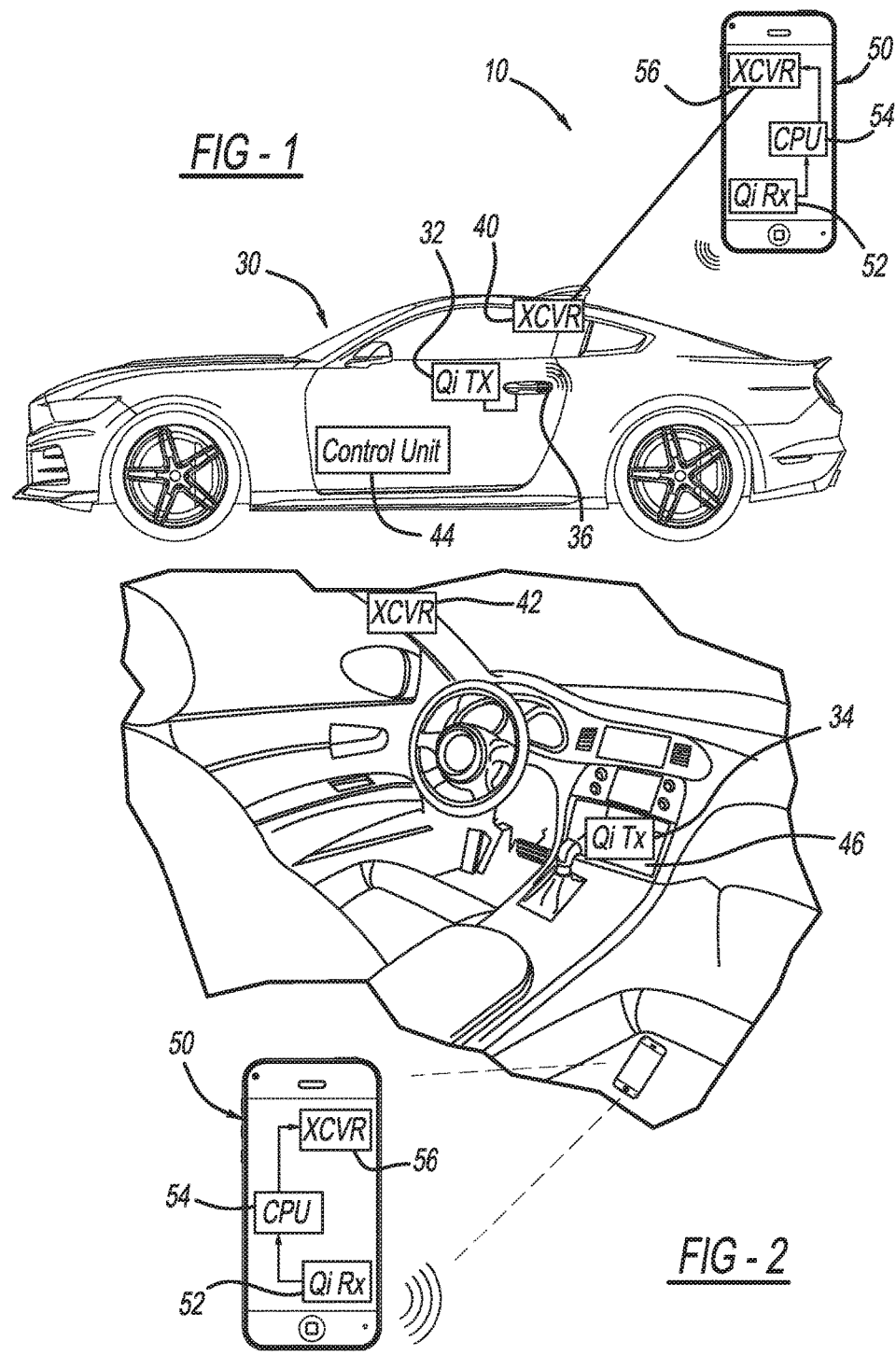
FIG. 1 illustrates a combined vehicle passive entry/passive start (PEPS) and wireless charging system for a mobile electronic device in accordance with the present teachings, the system being used for passive vehicle entry.
FIG. 2 illustrates the combined passive entry/passive start (PEPS) and wireless charging system for a mobile electronic device in accordance with the present teachings, the system being used for starting a vehicle.

With initial reference to FIG. 1, the present teachings provide for a combined passive entry/passive start (PEPS) and wireless charging system 10 for entering and starting any suitable vehicle 30 with any suitable mobile electronic device 50. The system 10 also provides for wirelessly charging the mobile electronic device 50. Although the vehicle 30 is illustrated as a four-door passenger vehicle, the system 10 can be used with any suitable vehicle, such as any suitable passenger vehicle, commercial vehicle, military vehicle, recreational vehicle, construction vehicle, construction equipment, motorcycle, watercraft, aircraft, etc. The system 10 according to the present teachings can also be adapted for use with any suitable building system, such as any suitable commercial, residential, or public building system, as one skilled in the art will appreciate. The mobile electronic device 50 can be any suitable mobile electronic device, such as any suitable smartphone, tablet computer, notebook computer, etc., as well as any suitable wearable electronic device including any suitable smartwatch or activity monitor.

In the example of the invention illustrated, the hardware of the vehicle 30 and the mobile electronic device 50 used for wireless charging is adapted to be further used for PEPS. The combined PEPS and wireless charging system 10 according to the present teachings thus includes one or more external transceivers or transmitters 32 (FIG. 1) for passive entry, and one or more internal transceivers or transmitters 34 (FIG. 2) for passive start. The transmitters 32 and 34 can be located at any suitable positions about the vehicle 30, and any suitable number of each transmitter 32 and 34 can be included. For example, the external transmitter 32 can be located in a door handle 36 of the vehicle 30. Although only one transmitter 32 is illustrated at one handle 36, the vehicle 30 can include a transmitter 32 at any of the other handles 36 as well, or at any other suitable location. The internal transmitter 34 can be located at a dashboard center stack of the vehicle 30 or at a ceiling of the vehicle 30, for example. The internal transmitter 34 can have any suitable range, such as a range that does not extend out from within the vehicle 30 so that the mobile electronic device 50 must be within the vehicle 30 for the vehicle 30 to start. In some applications, the internal transmitter 34 can be a single transmitter connected by wire to a number of coils/antennas at different locations.

Each one of the transmitters 32 and 34 can have its own antenna. Alternatively, a single transmitter 32 and/or a single transmitter 34 can be connected to multiple antennas positioned about the vehicle 30. Antennas for passive entry are mounted on the exterior of the vehicle 30, e.g., in door handles 36, the rear fascia, trunk, tailgate, etc. Antennas for passive start are mounted inside the vehicle 30. This configuration is similar to, or identical to, existing LF PEPS antenna systems. Existing LF PEPS antennas may be used because the present teachings provide for use of the same radio frequency.

Each one of the transmitters 32 and 34 is configured to transmit signals, such as a ping, using any suitable wireless standard, such as any suitable wireless charging standard. An exemplary wireless charging standard is the Qi standard, which is well known in the art. The mobile electronic device 50 includes a receiver 52 configured to receive the ping generated by the transmitters 32/34. Thus, the receiver 52 can be configured to receive the ping transmitted using the Qi wireless charging standard, or any other suitable wireless standard. The ping can be transmitted at any suitable frequency, such as 80-200 kilohertz, and more particularly 125 kilohertz. Transmission of the ping from either of the transmitters 32 and 34 to the Qi receiver 52 provides a first wireless communications channel between the vehicle 30 (specifically the transmitters 32 and 34) and the mobile electronic device 50.

The mobile electronic device 50 further includes a central processing unit (CPU), referred to herein as a processor module 54. In this application, any of the terms "module," "control unit," and "controller" may be replaced with the term "circuit." The terms "module," "control unit," and "controller" may each refer to, be part of, or include processor hardware (shared, dedicated, or group) that executes code, and memory hardware (shared, dedicated, or group) that stores code executed by the processor hardware. The code is configured to provide the features of the "modules," "control units," and "controllers" described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The processor module 54 is in communication with both the receiver 52 and a transmitter or transceiver 56 of the mobile electronic device 50. The transmitter 56 is configured to transmit signals to receivers of the vehicle 30, such as an external receiver or transceiver 40 for passive entry and an internal receiver or transceiver 42 for passive start. In some applications, a single vehicle receiver can be used for both passive entry and passive start, such as the transceiver 40. The transmitter 56 can be configured to transmit wireless signals in any suitable manner using any suitable wireless transmission protocol. For example, the transmitter 56 can be configured as a Bluetooth transmitter, and the receivers 40 and 42 can be Bluetooth receivers. The Qi ping received by the receiver 52 from the external Qi transmitter 32 or the internal Qi transmitter 34 is sent to the processor module 54.

The processor module 54 interprets the Qi ping and then formulates a response signal to the vehicle 30. The processor module 54 sends the formulated response signal to the transmitter 56, which transmits the response signal to the exterior receiver 40 and/or the interior receiver 42 depending on the response. Transmission of the response signal from the transmitter 56 to the receivers 40 and/or 42 provides a second wireless communications channel between the mobile electronic device 50 and the vehicle 30, and specifically the receivers 40 and/or 42 thereof. When the response signal is formulated as a door unlock signal, receipt of the response signal by the exterior receiver 40 will result in a processor module or control unit 44 of the vehicle 30 unlocking the vehicle. When the response signal is formulated as an engine start signal, receipt of the response signal by the interior receiver 42 will result in the processor module or control unit 44 of the vehicle 30 changing the power mode of the vehicle 30.

The second wireless communications channel can be a Bluetooth channel, for example. Another option for the second communications channel is ultra-wideband impulse radio (UWB-IR), which may be implemented on the mobile electronic device 50 in the form of a peripheral module or "tag" attached to the device 50, e.g., by adhesive. The use of UWB-IR allows the system 10 of the present teachings to measure the exact communication latency, thereby protecting against relay attacks in which an attacker captures signals and relays them between the vehicle 30 and the mobile electronic device 50 at long distance to allow unauthorized access. Other secondary communication channels are also feasible, including acoustic signals, cellular radio signals, etc. The second wireless communications channel transmits at a frequency that is higher than the first wireless communications channel.

With continued reference to FIGS. 1 and 2, and additional reference to FIG. 3, an exemplary method 110 for passively unlocking the vehicle 30, or any other suitable vehicle or building, will now be described. Although the method 110 is described with reference to the system 10, any other suitable passive entry/passive start (PEPS) system can be used. The combined PEPS and wireless charging system 10, and method 110, according to the present teachings operates similar to existing key fob PEPS systems, but with standardized communication protocols compatible with smartphones, and wireless charging functionality of smartphones.

Figure 3:
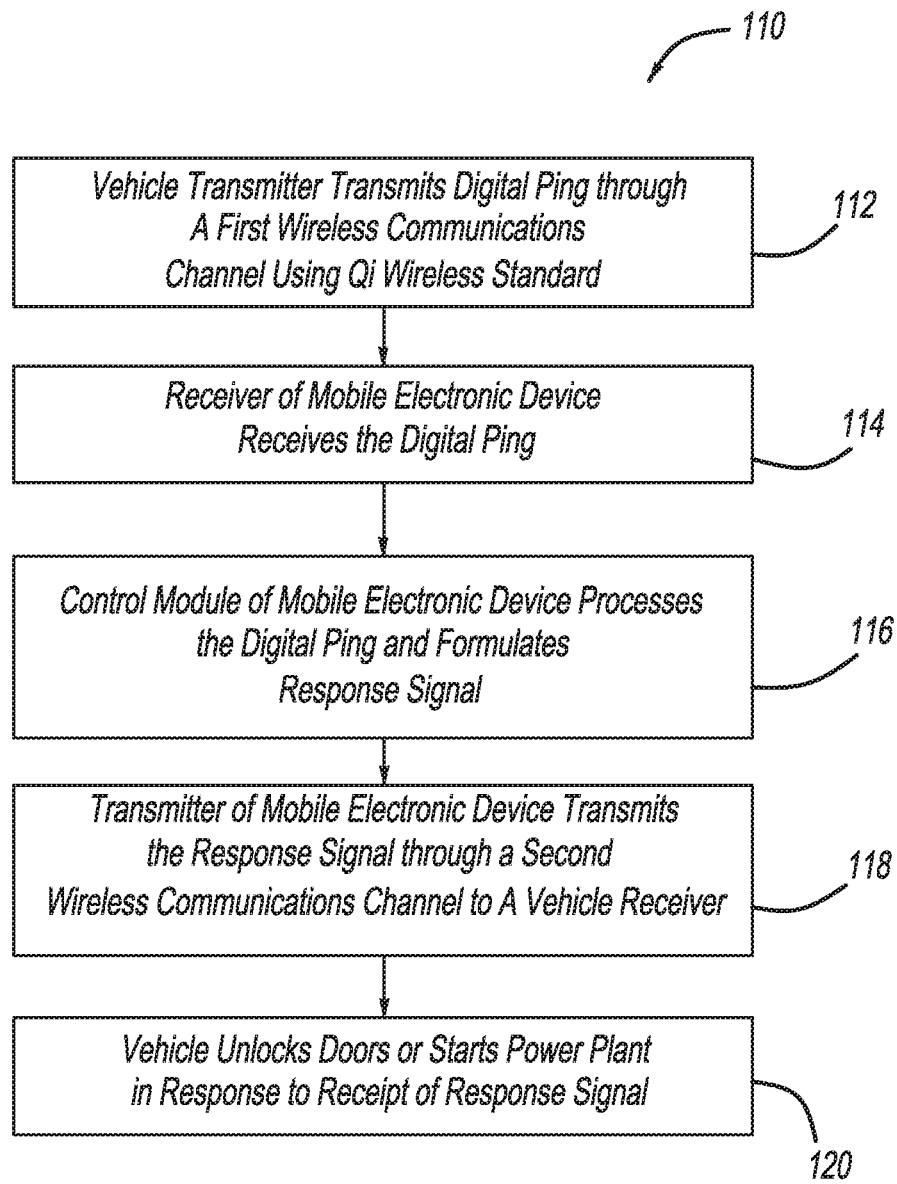
FIG. 3 illustrates a method according to the present teachings for passive entry and passive start of a vehicle.

With initial reference to block 112 of the method 110 illustrated in FIG. 3, when the user initiates a PEPS function, such as door unlocking or vehicle start, the external transmitter 32 transmits, using the Qi standard or any other suitable wireless charging standard, a signal (e.g., digital ping) by way of the applicable antenna(s) inside or outside the vehicle 30. The digital ping is of the same format as that regularly used in wireless charging systems operating under the Qi standard, but at a higher power level comparable to the power level of a conventional LF PEPS system (10 or more watts, for example). This allows the smartphone to receive the ping signal from a greater distance (such as 2 m-3 m, for example) as compared to a standard wireless charging system, which only transmits the ping signal about 0.1 m-0.2 m.

With reference to block 114 of the method 110, the receiver 52 of the mobile electronic device 50 receives the digital ping. The digital ping received by the receiver 52 is transmitted to the processor module 54 of the mobile electronic device 50 in any suitable manner. At block 116, the processor module 54 processes the digital ping and formulates a response signal depending on the digital ping. If the digital ping was received from the external Qi transmitter 32, the response signal instructs the vehicle 30 to open one or more of its doors (or trunk, tailgate, window(s), etc.). If the digital ping was received from the internal Qi transmitter 34, the response signal instructs the vehicle 30 to change a power mode thereof. The passive start feature of the present teachings enables a user to change the vehicle "power mode," which includes enabling the vehicle's comfort, convenience, and infotainment features in addition to starting the engine or motor. The response signal may be based on the data contained in the digital ping, a digital key(s) shared during the process of pairing the mobile electronic device 50 to the vehicle 30, both, or neither.

At block 118, the transmitter 56 of the mobile electronic device 50 transmits the response signal generated by the processor module 54 to the exterior receiver 40 or the interior receiver 42 through the second wireless channel, such as a Bluetooth channel. The control signal instructing the vehicle 30 to open its doors, etc. is received by the exterior receiver 40. The control signal instructing the vehicle 30 to change its power mode is received by the interior receiver 42. At block 120, the vehicle 30 unlocks its doors in response to the response signal being received by the exterior receiver 40; or the vehicle 30 changes its power mode in response to the response signal being received by the interior receiver 42.

With additional reference to FIGS. 4 and 5, the combined PEPS and wireless charging system 10 according to the present teachings can charge a battery 58 of the mobile electronic device 50. As a charging system, the system 10 functions in a manner similar to (or the same as) existing in-vehicle wireless charging systems, with the added advantage of allowing the user to access wireless charging from outside the vehicle 30. This functionality will be particularly useful in the event that the user needs access to the vehicle 30, but the mobile electronic device 50 has a dead battery 58.

The exterior of the vehicle 30 can be provided with any suitable support or holder 48 for the mobile electronic device 50 to facilitate charging, such as at the door handles 36 of the vehicle 30. To initiate charging of the battery 58 from outside the vehicle 30, the user can place the device 50 against, or proximate to, the transmitter 32 at the exterior of the vehicle 30. The support or holder 48 can be arranged to support the device 50 proximate to, or against, the transmitter 32. Communication between the device 50 and the transmitter 32 can be commenced in any suitable manner, such as by pressing a charge button of the device 50, Qi analog ping detection, or in any other suitable manner. The device 50 responds to the Qi transmitter 32, such as by way of the transmitter 56, to authenticate itself in order to prevent unauthorized use. The Qi transmitter 32 then initiates wireless charging of the device 50.

The interior of the vehicle 30 can be provided with any suitable dock or holder 46 for the mobile electronic device 50 to facilitate charging, such as at a center stack of a dashboard as illustrated in FIG. 5. To initiate charging of the battery 58 from inside the vehicle 30, the user can place the device 50 against or proximate to the transmitter 34 at the interior of the vehicle 30, which may be incorporated into the dock 46. The dock or holder 46 can be arranged to support the device 50 proximate to, or against, the transmitter 34. Communication between the device 50 and the transmitter 34 can be commenced in any suitable manner, such as by pressing a charge button of the device 50, Qi analog ping detection, or in any other suitable manner. The device 50 responds to the Qi transmitter 34, such as by way of the transmitter 56, to authenticate itself in order to prevent unauthorized use. Authentication is optional and not used in all applications. The Qi transmitter 34 then initiates wireless charging of the device 50.

The combined PEPS and wireless charging system 10 according to the present teachings provide numerous advantages. For example, the combined PEPS and wireless charging system 10 can advantageously be implemented with a standardized wireless charging receiver, which is included with an ever increasing number of mobile electronic devices 50. The combined PEPS and wireless charging system 10 can operate using any suitable standard, such as the Qi standard, or any other suitable wireless charging standard. The combined PEPS and wireless charging system 10 according to the present teachings is configured to use the same low frequency (LF) radio frequency as a conventional PEPS system, allowing accurate and predictable location of a device 50 to be used as a vehicle key. The present teachings also can be advantageously implemented without requiring new smartphone hardware or vehicle hardware.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A combined vehicle passive entry/passive start (PEPS) and mobile electronic device wireless charging system, the system comprising:
   a vehicle transmitter configured to transmit a signal in accordance with a wireless charging protocol, the signal transmitted through a first wireless communications channel for receipt by a mobile electronic device; wherein the first wireless communication channel is a first frequency channel, and the second wireless communications channel is a second frequency channel at a higher frequency than the first frequency channel;
   a vehicle receiver configured to receive response data from the mobile electronic device through a second wireless communications channel, the response data generated by the mobile electronic device in response to receipt of the signal transmitted by the vehicle transmitter; and
   a vehicle processor module configured to at least one of unlock doors of the vehicle and start the vehicle in response to receipt of the response data by the vehicle receiver.

2. The system of claim 1, wherein the vehicle transmitter is configured to transmit the signal at 80-200 kilohertz.

3. The system of claim 1, wherein the vehicle transmitter is a first vehicle transmitter at an exterior of the vehicle for passive entry; and
   wherein a second vehicle transmitter is at an interior of the vehicle for passive change of a power mode of the vehicle.

4. The system of claim 1, wherein the vehicle transmitter is connected to multiple antennas and/or coils outside of the vehicle for passive entry and/or passive start.

5. The system of claim 1, wherein the vehicle transmitter is configured to generate an electromagnetic field to transfer energy to the mobile electronic device through electromagnetic induction to charge a battery of the mobile electronic device, and the transfer of energy is initiated through the wireless charging protocol.

6. A combined passive entry/passive start (PEPS) and wireless charging system for a mobile electronic device, the system comprising:
   a vehicle transmitter configured to transmit a digital ping in accordance with a wireless charging protocol, the digital ping transmitted at a first frequency and through a first wireless communications channel;
   a mobile electronic device receiver of the mobile electronic device configured to receive the digital ping;
   a mobile electronic device processor module of the mobile electronic device configured to generate response data in response to the digital ping;
   a mobile electronic device transmitter of the mobile electronic device configured to transmit the response data to a vehicle having the vehicle transmitter by way of a second wireless communications channel at a second frequency that is higher than the first frequency;
   a vehicle receiver configured to receive the response data; and
   a vehicle processor module configured to at least one of unlock doors of the vehicle and start the vehicle in response to receipt of the response data by the vehicle receiver.

7. The combined PEPS and wireless charging system of claim 6, wherein the digital ping is transmitted at a power level of at least 10 watts.

8. The combined PEPS and wireless charging system of claim 6, wherein the vehicle transmitter is configured to transmit the digital ping at a distance of 2 m-3 m.

9. The combined PEPS and wireless charging system of claim 6, wherein the second wireless communications channel is Ultra-Wideband Impulse Radio (UWB-IR).

10. The combined PEPS and wireless charging system of claim 6, wherein the vehicle transmitter is configured to generate an electromagnetic field to transfer energy to the mobile electronic device through electromagnetic induction to charge a battery of the mobile electronic device.

11. The combined PEPS and wireless charging system of claim 10, wherein the transfer of energy is initiated through the wireless charging protocol.

12. The combined PEPS and wireless charging system of claim 10, wherein the electromagnetic field is generated at an exterior of the vehicle to permit wireless charging of the mobile electronic device at an exterior of the vehicle.

13. The combined PEPS and wireless charging system of claim 6, wherein the mobile electronic device is at least one of a smartphone, wearable electronic device, a tablet computer, vehicle key fob, and a notebook computer.

14. A method for passive entry and passive start of a vehicle comprising:

transmitting a first signal from a vehicle transmitter of the vehicle to a mobile electronic device through a first wireless communications channel using a wireless charging standard; wherein the first wireless communication channel is a first frequency channel, and the second wireless communications channel is a second frequency channel at a higher frequency than the first frequency channel;

receiving the first signal at a receiver of the mobile electronic device;

processing the first signal and formulating a second signal with a processor module of the mobile electronic device;

transmitting the second signal from a transmitter of the mobile electronic device to a receiver of the vehicle through a second wireless communications channel; and unlocking doors of the vehicle or changing a power mode of the vehicle in response to receipt of the second signal at the vehicle.

* * * * *

UNITED STATES PATENT AND TRADEMARK OFFICE
CERTIFICATE OF CORRECTION

PATENT NO. : 10,035,494 B2
APPLICATION NO. : 15/437236
DATED : July 31, 2018
INVENTOR(S) : Sute It is certified that error appears in the above-identified patent and that said Letters Patent is hereby corrected as shown below:

On the Title Page

Column 1, (73) Assignees, Line 3, delete "Kariya, Aichi-pref." and insert --Kariya-shi, Aichi-ken-- therefor Signed and Sealed this
Thirtieth Day of July, 2019

Andrei Iancu
*Director of the United States Patent and Trademark Office*